Aug. 15, 1950     M. E. SMITH     2,518,950
POULTRY FEEDER
Filed March 8, 1948     2 Sheets-Sheet 1
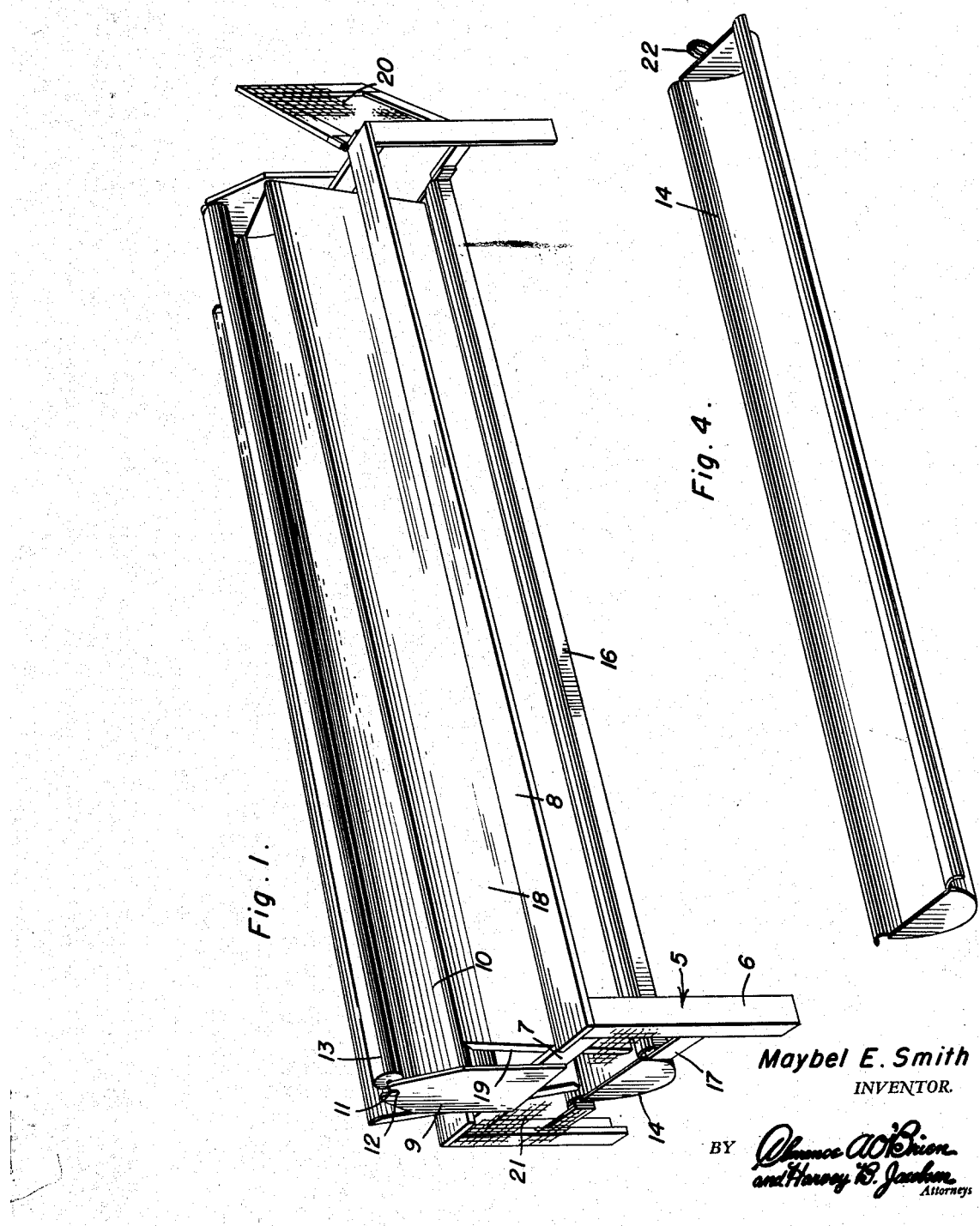
Maybel E. Smith
INVENTOR.

Aug. 15, 1950  M. E. SMITH  2,518,950
POULTRY FEEDER
Filed March 8, 1948  2 Sheets-Sheet 2
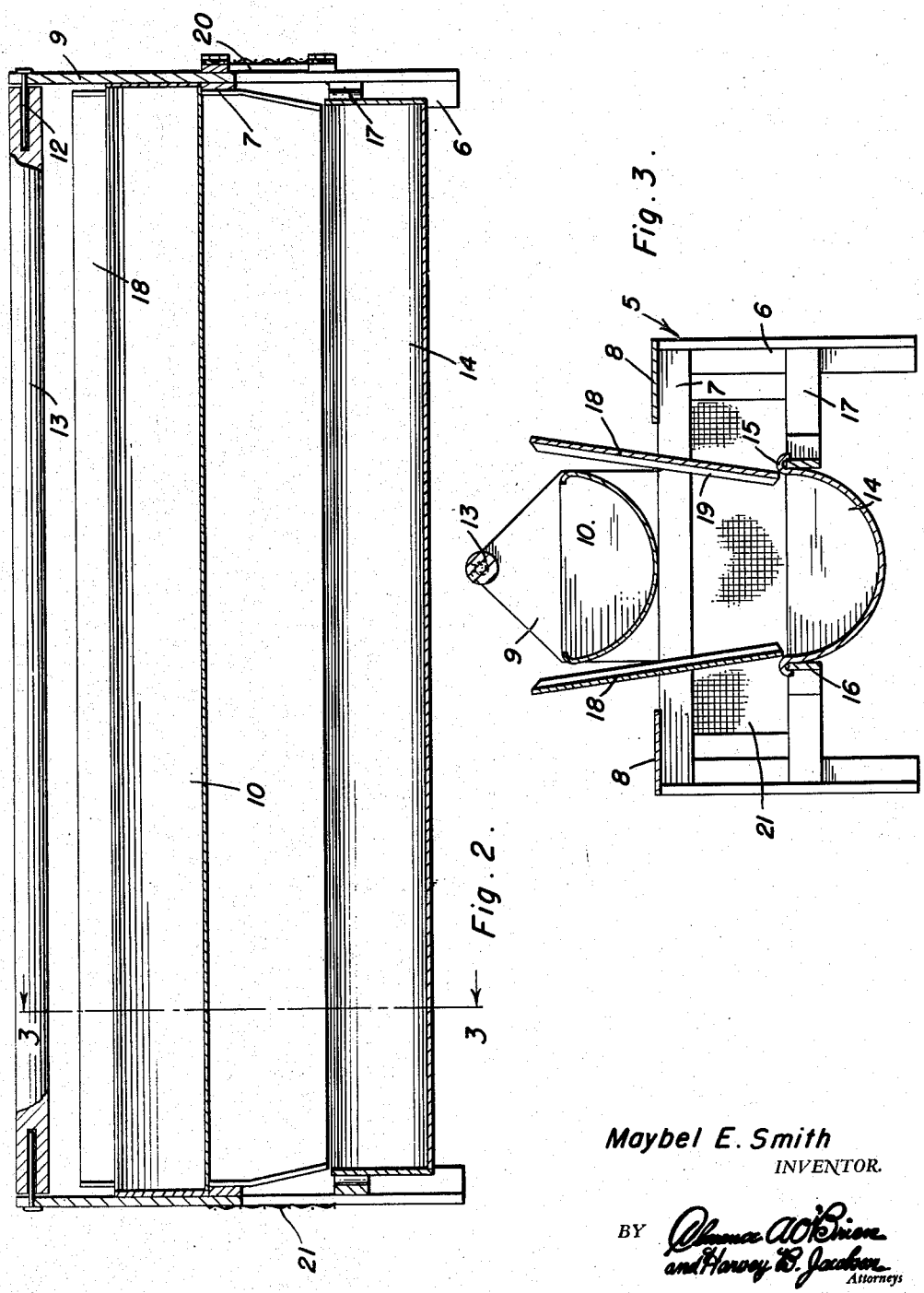
Maybel E. Smith
INVENTOR.

Patented Aug. 15, 1950

2,518,950

UNITED STATES PATENT OFFICE 2,518,950

POULTRY FEEDER

Maybel E. Smith, Bloomington, Ind.

Application March 8, 1948, Serial No. 13,641

1 Claim. (Cl. 119—61)

The present invention relates to new and useful improvements in poultry feeders and more particularly to a device of this character for use in feeding chickens or other poultry with a minimum waste of food.

An important object of the invention is to provide an upper feeding trough and a lower waste-feed collecting trough together with a guard at the side edges of the feeding trough for conveying feed scattered by the chickens into the collecting trough whereby to prevent waste thereof.

A further object of the invention is to provide a support for the upper and lower trough and on which the lower trough is removably supported to enable removal thereof to return the feed collected therein into the feeding trough.

A still further object of the invention is to provide a device of this character of simple and practical construction, which is strong and durable, efficient and reliable in use, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view;

Figure 2 is a longitudinal sectional view;

Figure 3 is a transverse sectional view taken substantially on a line 3—3 of Figure 2; and Figure 4 is a perspective view of the removable collecting trough.

Referring now to the drawings in detail wherein, for the purpose of illustration, I have disclosed a preferred embodiment of the invention, the numeral 5 designates a supporting frame generally composed of angle iron corner posts 6, the posts at each end of the frame being connected to each other by upper transverse bars 7 and the corner posts at each side of the frame supporting a longitudinally extending perch 8.

A pair of end plates 9 extend upwardly from the upper cross bars 7 and to the inner side of which is suitably secured an upper feeding trough 10, the bottom of the trough resting on the cross bars 7, as shown more clearly in Figure 2 of the drawings.

Notches 11 are formed in the upper ends of plates 9 and in which the reduced ends 12 of a roller 13 are rotatably supported in an elevated position above the center of the trough 10.

A lower feed-collecting trough 14 is formed with downwardly turned channel-shaped side edges 15 removably supported on longitudinally extending rails 16 supported inwardly of the posts 6 at each side of the frame by arms 17 suitably secured to the posts, the lower feed-collecting trough 14 being supported in a position immediately below the upper feeding trough 10.

Guards 18 are positioned at each side of the upper trough 10 and are formed with flanges 19 at each end of the guard, welded or otherwise suitably secured to the cross bars 7. The guards 18 are positioned with their upper edges projecting upwardly above the side edges of the upper feeding trough 10 and are inclined inwardly to position their lower ends inwardly of the side edges of the lower feed-collecting trough 14, as shown more clearly in Figure 3 of the drawings.

A screen door 20 is hingedly connected at one edge for horizontal swinging movement to one of the corner posts 6 at one end of the frame for closing the end of the frame between the upper and lower troughs and the opposite end of the frame is provided with a fixed screen 21 closing said end of the frame between the upper and lower trough.

In the operation of the device, the chickens stand on the perch 8 outwardly of the guards 18 at each side of the frame to feed from the upper trough 10. Any feed scattered by the chickens will be deflected downwardly by the guards 18 into the feed collecting trough 14 to recover the same and to prevent waste of the feed.

The end of the collecting trough 14 adjacent the door 20 is provided with a handle 22 to facilitate its removal from the supporting rails 16 when the door is open, whereby the feed collected in the trough may be returned to the feeding trough 10.

The rotatable perch 13 prevents poultry from perching above the feeding trough 10.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claim.

Having described the invention, what is claimed as new is:

A poultry feeder comprising a frame including a pair of lower side rails, a lower feed collecting trough having hangers at its side edges removably supported on said rails and suspending said trough on said rails for sliding endwise out of one end of the frame, an upper feeding trough supported in the frame above the lower trough parallel therewith, and guards positioned upon opposite sides of the upper trough and depending into opposite sides of the lower trough, said guards deflecting feed scattered by the poultry when feeding from the upper trough into the lower trough, said lower trough being endwise slidable past the guards out of said end of the frame.

MAYBEL E. SMITH.

REFERENCES CITED

The following references are of record in the file of this patent:

UNITED STATES PATENTS

| Number | Name | Date |
|---|---|---|
| 2,330,295 | Lindquist | Sept. 28, 1943 |